United States Patent

[11] 3,581,841

| [72] | Inventor | Burt F. Raynes<br>Chula Vista, Calif. |
|---|---|---|
| [21] | Appl. No | 58,301 |
| [22] | Filed | July 27, 1970 |
| [45] | Patented | June 1, 1971 |
| [73] | Assignee | Rohr Corporation |

[54] THRUST REVERSING AND NOISE SUPPRESSING APPARATUS FOR A JET ENGINE
10 Claims, 7 Drawing Figs.

[52] U.S. Cl.................................................. 181/33Hc,
181/33HD, 239/127.3, 239/265.13, 239/265.17,
239/265.33, 181/51
[51] Int. Cl.................................................... B64d 33/06,
F01n 1/14
[50] Field of Search............................................ 181/33, 43,
51, 33.22, 33.221, 33.222, 35, 36; 239/127.3,
265.17, 265.11, 265.13, 265.33

[56] References Cited
UNITED STATES PATENTS

| 2,487,588 | 11/1949 | Price ............................. | 239/265.23 |
| 2,683,961 | 7/1954 | Britton et al.................. | 239/265.33X |
| 3,084,507 | 4/1963 | Kleinhans et al. ............ | 239/265.17 |

FOREIGN PATENTS

| 537,871 | 2/1932 | Germany....................... | 181/51 |
| 871,403 | 6/1961 | Great Britain................ | 239/265.33 |

*Primary Examiner*—Robert S. Ward, Jr.
*Attorney*—George E. Pearson

ABSTRACT: Tubular ejectors are arranged so that in a retracted position they are concentrically disposed around a thrust nozzle projecting from aircraft jet engine nacelle and in a deployed sound-suppressing and thrust-augmenting position they are disposed downstream from the nozzle in coaxial relation therewith and telescope relative to one another with the largest ejector spaced farthest from the nozzle. Blocker doors are arranged to close apertures in the wall of largest ejector or to extend transverse to the apertures and deflect engine jet stream forwardly therethrough to thereby reverse the thrust of the downstream. At takeoff ejectors are deployed to augment thrust and blocker doors are closed. If takeoff must be aborted, blocker doors can be deployed to reverse thrust. During landing only the largest ejector is deployed downstream from nozzle and the blocker doors are deployed.

PATENTED JUN 1 1971

INVENTOR.
BURT F. RAYNES
BY
Edwin D. Grant
ATTORNEY

INVENTOR.
BURT F. RAYNES
BY Edwin D. Grant
ATTORNEY 3,581,841

THRUST REVERSING AND NOISE SUPPRESSING APPARATUS FOR A JET ENGINE

SUMMARY OF THE INVENTION

This invention relates to jet propulsion apparatus which in one operational mode suppresses the noise of an aircraft jet engine and augments the thrust of its jet stream, and which in other operational modes reverses said thrust to thereby decelerate the aircraft.

In accordance with this invention, two or more tubular ejectors are arranged so that they can either be concentrically nested one within another adjacent the aft end of a housing enclosing an aircraft jet engine (which housing may be either an engine nacelle or a fuselage), or translated downstream from said housing so that the jet stream of the engine within the latter discharges therethrough. More specifically, when the ejectors are deployed to the downstream position their ends are disposed in telescoped, concentrically spaced relation and each ejector is coaxial with the thrust nozzle of the jet engine, the ejectors having the largest diameters being progressively spaced farthest from said nozzle. Thus when the ejectors are deployed slipstream air flows into their interiors through the gaps between the telescoped ends thereof, and this air mixes with the jet stream which issues from the nozzle and flows through the ejectors. This flow of air not only augments the thrust of the jet stream but, by cooling the hot gas, also reduces the noise generated by flow of the same through the atmosphere. The ejector which is farthest downstream in the deployed position has apertures in the wall thereof, and blocker doors are mounted on the same ejector for movement between a first position wherein they close said apertures and a second position wherein they extend across the channel of the ejector and deflect the jet stream forwardly through the apertures to thereby reverse the thrust of the propulsion apparatus. The ejectors are positioned in the described thrust-augmenting and sound-suppressing configuration when the aircraft provided therewith is taking off and climbing to cruising altitude. If takeoff must be aborted, the blocker doors can be swung to the aforesaid second position thereof, thereby reversing the thrust of the jet engine and decelerating the aircraft. During cruise flight the ejectors are nested together at the aft end of the engine housing, and when the aircraft is landing the ejector having blocker doors is translated downstream so that the jet stream flows therethrough and the blocker doors are then deployed to deflect the same forwardly so as to reverse thrust.

DETAILED DESCRIPTION

Figure 1:
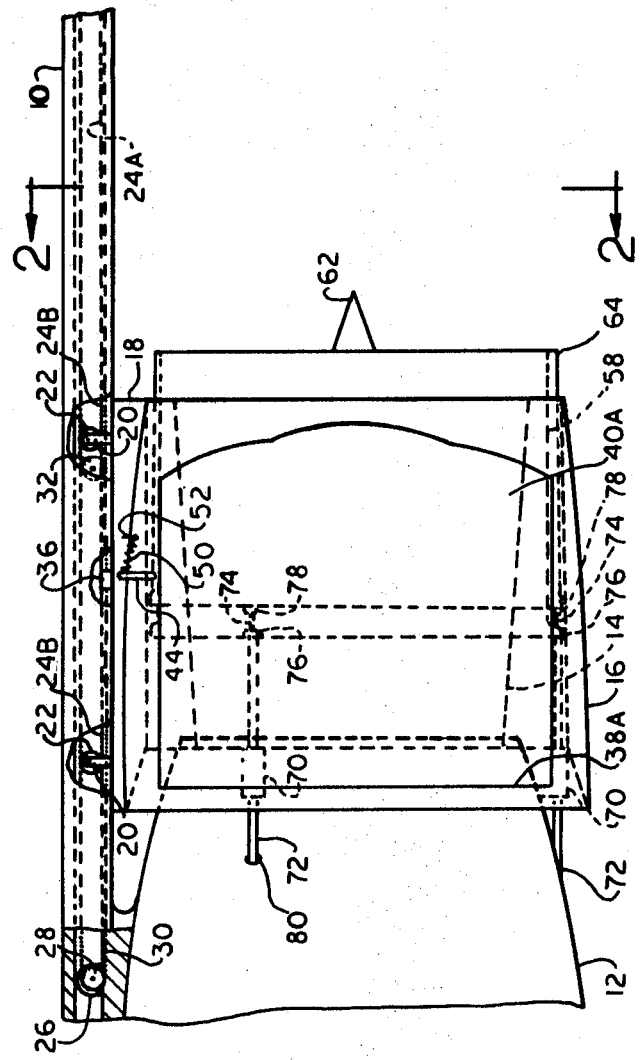
FIG. 1 is a side elevation of a preferred embodiment of the invention, illustrating three ejectors of the embodiment in a first position thereof and with portions of a pylon cut away to show certain components.
Figure 3:
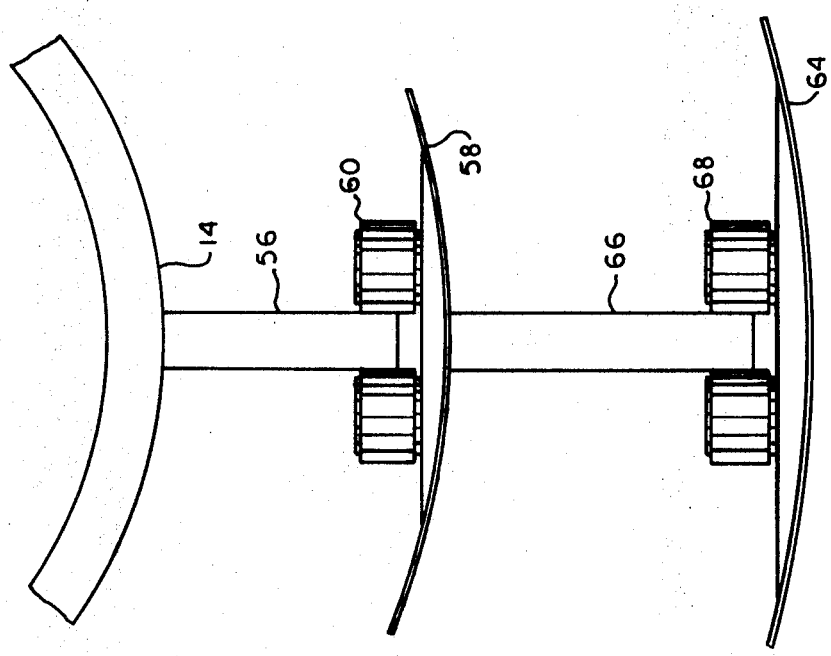
FIG. 3 is an enlarged fragmentary view of components illustrated in FIG. 2, taken at the area on the latter drawing which is within the circle identified by the number 3.
Figure 2:
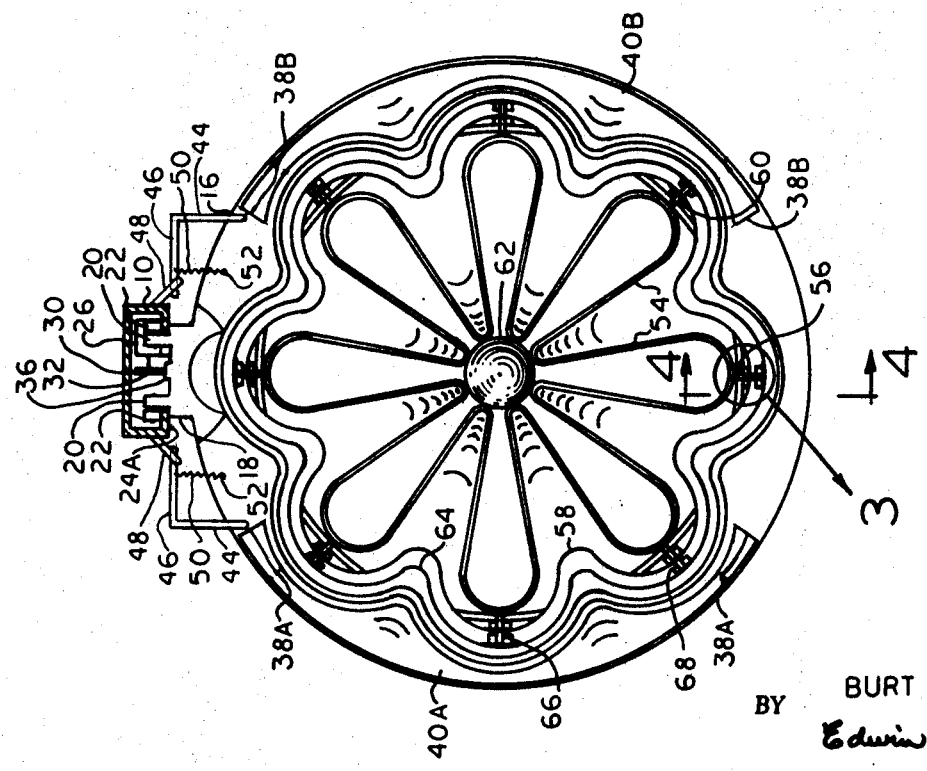
FIG. 2 is an end elevation of the same embodiment, said pylon being illustrated in section and the view being taken along the plane represented by line 2-2 in FIG. 1 and in the direction indicated in the latter drawing.

As illustrated in FIG. 1, the preferred embodiment of this invention comprises a pylon 10 one end of which is fixedly attached to a nacelle 12 containing an aircraft jet engine (not shown). The longitudinal axis of pylon 10 is parallel with the longitudinal axis of the thrust nozzle 14 of the aforesaid jet engine, which nozzle projects rearwardly from the aft end of nacelle 12 and is represented by broken lines in FIG. 1. Suspended from pylon 10 is a first tubular ejector 16. More specifically, a support member 18 is fixedly attached to ejector 16 and extends between the ends thereof, this member having a flat upper surface from which four arms 20 (see FIG. 2 also) project. The aforesaid arms are arranged in transversely opposed pairs at the forward and aft portions of member 18 and, as can be seen in FIG. 2, each arm is located a short distance from a respective one of the longitudinally extending edges of said member. Each arm 20 carries a roller 22 which engages the upper surface of a respective one of two flanges 24A, 24B which extend longitudinally of pylon 10 and which project inwardly from respective lower edges of the sides thereof. The portions of the upper surface of member 18 adjacent the longitudinally extending edges thereof slidably engage the lower surfaces of respective flanges 24A, 24B, and the sides of arms 20 slidably engage the end surfaces of flanges 24A. 24B, thus permitting ejector 16 to be moved longitudinally on pylon 10 but maintaining it in coaxial relation with nozzle 14. Furthermore, ejector 16 is of such size that it fits around another ejector which will be described hereinafter.

Figure 6:
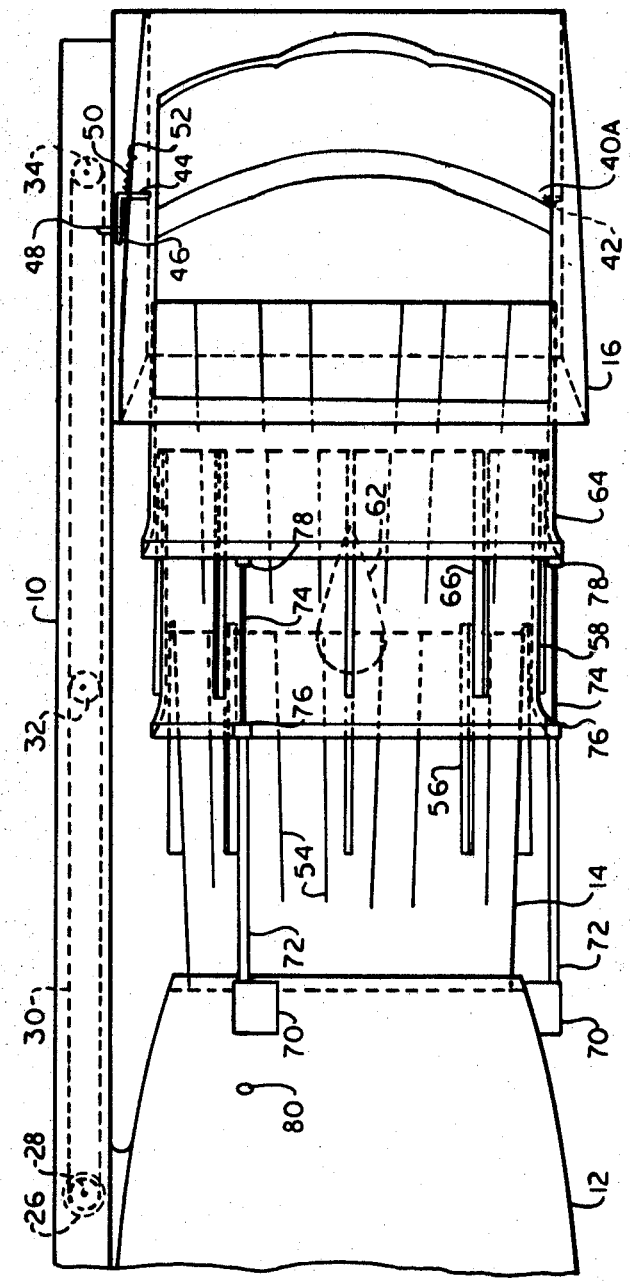
FIG. 6 is a side elevation of the embodiment, illustrating one ejector in a third position thereof.

As illustrated in FIG. 1, ejector 16 is driven in opposite directions along pylon 10 by means of a drive assembly comprising a motor 26 which may be of any suitable type and which, through suitable gears contained in the housing thereof, rotates a sprocket 28 engaged with a continuous drive chain 30, the latter also being engaged with two idler sprockets 32, 34 (see FIG. 6 also) rotatably mounted on pylon 10. A lug 36 projects from the upper surface of member 18 and is connected to chain 30. Suitable means (not shown) are provided to stop motor 26 when ejector 16 has been moved to positions along pylon 10 which will be described hereinafter. Ejector 16 has a pair of apertures 38A, 38B formed in the wall thereof, which apertures are disposed on opposite sides of the ejector. FIG. 2 also illustrates a pair of blocker doors 40A, 40B which respectively conformably fit within these apertures, each blocker door being pivotally connected to ejector 16 by means of a pin 42 (illustrated by broken lines in FIG. 6) which is positioned in a bearing (not shown) mounted in a recess in the lower edge of a respective one of the apertures 38A, 38B, and also by means of a shaft 44 which is fixedly connected at its lower end to the upper edge of the associated door and which extends through a vertically extending hole formed in the wall of the ejector adjacent the upper edge of the same aperture. The upper end of each shaft 44 projects from the outer surface of ejector 16, and an arm 46 is fixedly connected thereto. When ejector 16 is moved to the position thereof which is illustrated in FIG. 6, the two arms 46 respectively engage two bars 48 which are fixedly mounted on pylon 10 and which project outwardly and downwardly from opposite sides thereof, thereby swinging blocker doors 40A, 40B across the passage in said ejector. The edges of blocker doors 40A, 40B which are adjacent the aft end of ejector 16 in FIG. 1 then abut each other at the center of said ejector. Each blocker door is biased toward the position illustrated in FIG. 1 by means of a spring 50 one end of which is connected to the arm 46 associated with the door and the other end of which is connected to a lug 52 projecting from the side of ejector 16.

Figure 4:
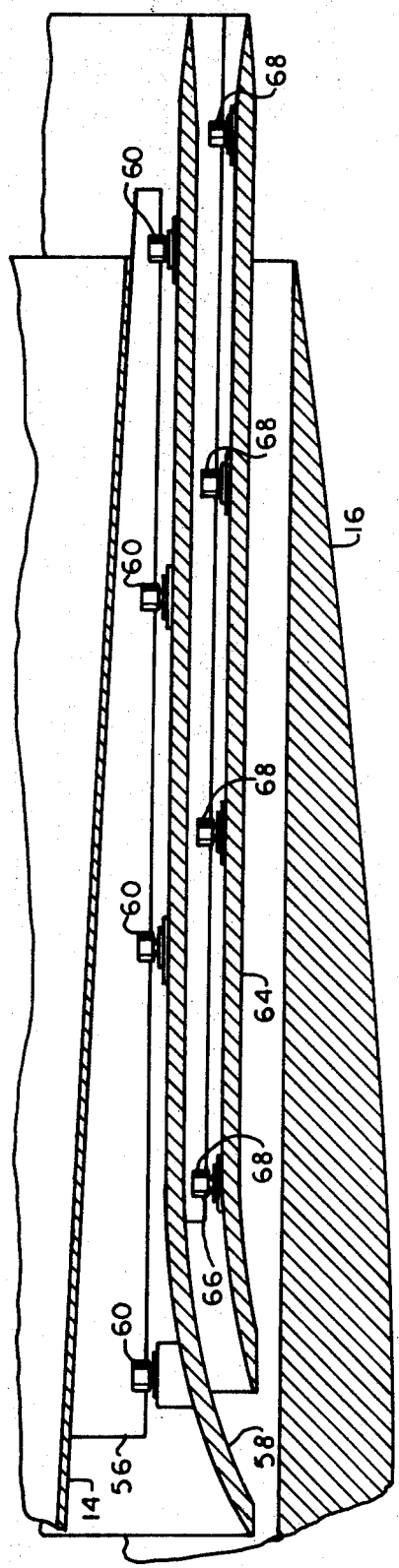
FIG. 4 is a longitudinal sectional view of the same components, taken along the plane represented by the line 4-4 in FIG. 2 and in the direction indicated in the latter drawing, with fragments of associated components also being shown.

At its forward end nozzle 14 has the form of a hollow cylinder. However, there are eight indentations in the wall of the nozzle which are evenly spaced apart circumferentially of the nozzle and which extend longitudinally thereof, these indentations being shallow at the forward end of the nozzle and gradually becoming deeper toward the aft end of the nozzle to thereby provide eight radially projecting lobes 54 (see FIG. 2)

through which exhaust gas is discharged. Rails 56 (one of which is illustrated in plan view in FIG. 4) are respectively fixedly attached to lobes 54 and extend lengthwise thereof. More explicitly, each rail 56 is formed of an elongate plate which extends radially from the outer surface of a respective one of the lobes 54 and the aft end of which projects a short distance from the aft end of nozzle 14. Rails 56 are respectively abuttingly disposed between a plurality of rollers 60 mounted in longitudinally extending rows on the inner surface of an ejector 58.

It will be recognized that the described arrangement of rails 56 and rollers 60 permits ejector 58 to be moved longitudinally of nozzle 14 but prevents it from rotating about the latter and maintains it in coaxial relation therewith. As in the case of first ejector 16, the wall of second ejector 58 is shaped to conform with the lobes 54 of nozzle 14, so that the gap between the ejector and the nozzle is substantially the same at all oppositely disposed points thereon. A bullet 62 is mounted at the center of nozzle 14 and projects rearwardly from the aft end thereof, which component is not, of course, an essential part of apparatus in accordance with the invention.

A third tubular ejector 64 is sized to fit around second ejector 58 and within first ejector 16. This ejector is mounted on ejector 58 by the same arrangement employed to mount the latter on nozzle 14. More particularly, a rail 66 is fixedly secured to each lobe of ejector 58 and extends lengthwise thereof, said rail projecting radially from the ejector and being abuttingly disposed between a plurality of rollers 68 mounted on longitudinally extending rows on the inner surface of ejector 64. Hence ejector 64 can be moved longitudinally of ejector 58 but is prevented from rotating about the latter and is maintained in coaxial relation therewith. Ejector 64 is shaped to conform with the arches of ejectors 16 and 58.

Ejectors 58 and 64 are moved toward and away from nacelle 12 by means of three drive motors 70 which may be of any suitable type and which are fixedly mounted on the aft end of nacelle 12 and evenly spaced apart circumferentially thereof. More specifically, a first tubular drive shaft 72 extends through an aperture in each motor 70 and is disposed parallel with the longitudinal axis of nozzle 14, and one end of a second drive shaft 74 is disposed within the aperture in said first shaft. The aft end of each shaft 72 is connected to a respective one of three lugs 76 fixedly attached to ejector 58 and projecting radially from the forward edge thereof. The aft end of each shaft 74 is likewise connected to a respective one of three lugs 78 fixedly attached to ejector 64 and projecting forwardly from the forward edge thereof. Motors 70 are synchronized so as to move shafts 72 and 74 either toward or away from nacelle 12 at the same velocity, which movement of the shafts simultaneously moves ejectors 58 and 64 toward or away from said nacelle. When shafts 72 are positioned as illustrated in FIG. 1, the forward ends of the shafts extend through holes 80 in the wall of nacelle 12. As will be recognized by persons skilled in the art of aircraft manufacture, different mechanisms of conventional design can be employed to move shafts 72 and 74 in the manner described, such as, for example, gears driven by motors 70.

OPERATION

In accordance with this invention, each engine nacelle of a jet propelled aircraft is provided with ejectors 16, 58 and 64 as described hereinbefore. When an aircraft so equipped is flying at an altitude at which suppression of the noise of its jet engines is not required, the ejectors of each nacelle are concentrically positioned around the associated nozzle 14 as illustrated in FIG. 1, providing a streamlined configuration.

Figure 5:
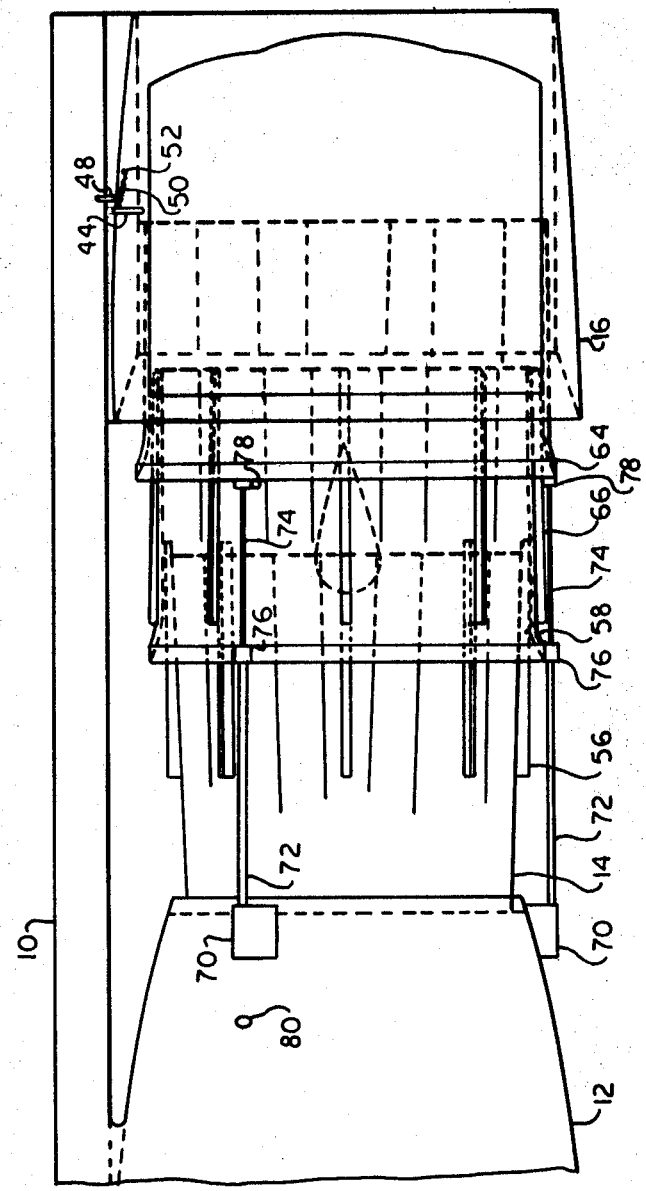
FIG. 5 is a side elevation of the same embodiment, the aforesaid ejectors being illustrated in a second position thereof wherein each ejector is located aft of its illustrated position in FIG. 1.

FIG. 5 illustrates the ejectors as they appear when the aircraft is taking off and climbing to cruising altitude, at which time the forward end of an ejector 58 is concentrically spaced around the aft end of a nozzle 14, the forward end of an ejector 64 is concentrically spaced around the aft end of said ejector 58, and the forward end of an ejector 16 is concentrically spaced around said ejector 64. It will be apparent that the ejectors can readily be translated from the position illustrated in FIG. 1 to the position illustrated in FIG. 5 by simultaneous operation of motor 26 and motors 70. In the latter configuration of the ejectors, ambient air flowing past each nozzle 14 enters the gap between said nozzle and ejector 58 and the gaps between the ejectors themselves. Thus three annular streams of ambient air are successively mixed with the exhaust gas issuing from each nozzle, which reduces the noise associated with the jet streams. Furthermore, the flow of air through the ejectors augments the thrust of jet propulsion units associated therewith. It will be noted that arms 46 do not contact bars 48 when an ejector 16 is in the deployed position illustrated in FIG. 5.

FIG. 6 illustrates ejector 16 when it has been moved rearwardly from the position thereof which is illustrated in FIG. 5 and its blocker doors 40A, 40B are positioned for thrust reversal. If takeoff of the aircraft provided with the disclosed apparatus must be aborted for any reason, ejector 16 is moved from its FIG. 5 position to its FIG. 6 position by operation of motor 26, respectively engaging arms 46 with bars 48 and swinging the blocker doors across the passage in the ejector. Thereafter exhaust gas and ambient air introduced into ejector 16 are deflected forwardly through the apertures 38A, 38B in the wall thereof, thus reversing the direction of thrust of the propulsion units and decelerating the aircraft.

Figure 7:
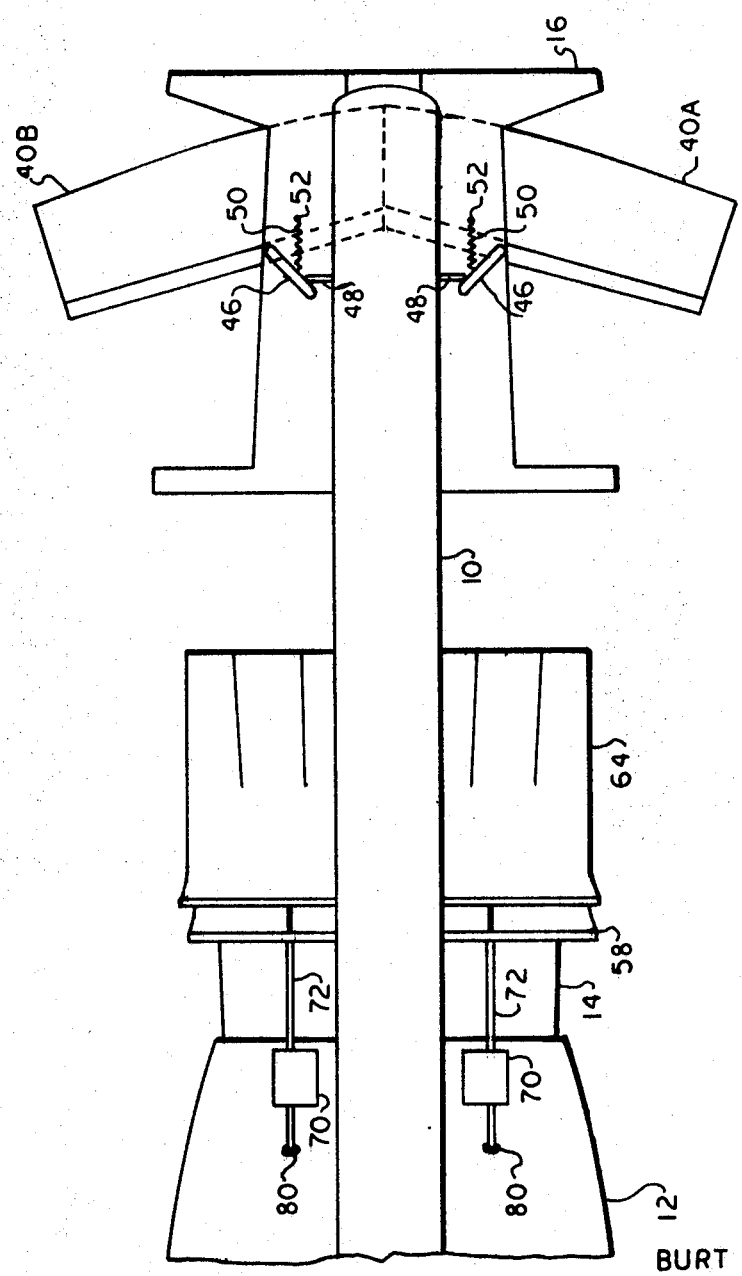
FIG. 7 is a plan view of the embodiment, illustrating still another operational mode thereof.

It will be obvious that after takeoff and climb have been accomplished motor 26 and motors 70 can be operated to return the ejectors to the position thereof which is illustrated in FIG. 1. At the time the aircraft is landing and must be decelerated, motor 26 is operated to move ejector 16 downstream while ejectors 58 and 64 are maintained in the forward position (see FIG. 7). As described hereinbefore, blocker doors 40A, 40B are swung across the channel of ejector 16 when arms 46 engage bars 48 as said ejector is moving to the position illustrated in FIG. 7. After the aircraft has been decelerated by impingement of the jet streams of its engines upon the respective sets of blocker doors associated therewith, motor 26 can be operated to return ejector 16 to the forward position illustrated in FIG. 1. Springs 50 pull the blocker doors to the closed position as soon as arms 46 disengage from bars 48.

A particular advantage of the disclosed apparatus is that the ejectors thereof can be deployed to augment thrust and suppress noise when the aircraft provided therewith is operating at low speed and climb-out, and the ejectors can then be retracted to the streamlined configuration illustrated in FIG. 1 to provide good performance in cruise flight. Also, when the doors are in the forward, retracted position air flows through the gap between the innermost ejector and thrust nozzle 14, which ventilates the base area of said nozzle and improves performance of the propulsion assembly in cruise flight. Furthermore, the disclosed apparatus not only provides for thrust reversal of a jet engine during the landing of an aircraft but also permits a rapid shift from a thrust augmenting mode of operation to a thrust reversing mode of operation, which is of great advantage when the takeoff of an aircraft must be aborted after it has reached a relatively high velocity.

Although the invention has been described with reference to a particular embodiment of the same, it should not be considered to be limited thereto for various modifications could be made therein by one having ordinary skill in the art without departing from the spirit and scope of the invention as defined in the following claims. For example, rollers 68 may be replaced with any type of suitable bearing or other antifriction device.

What I claim as new and useful and desire to be secured by U.S. Letters Patent is:

1. In an aircraft having a jet engine enclosed within a tubular housing, sound-suppressing and thrust-reversing apparatus comprising:
   at least two tubular ejectors operatively associated with said aircraft and movable between a first position wherein they are disposed in concentric, nested relation adjacent the aft end of said housing and substantially coaxial therewith and a second position therein they are in end-to-end relation downstream from the thrust nozzle of said engine and substantially coaxial therewith so that the jet stream issuing therefrom flows therethrough, in said second position the ejectors having the largest diameters being progressively spaced farthest from said nozzle and the adjacent ends of the ejectors being disposed in spaced, substantially concentric relation so that slipstream air flowing past said housing enters each of said ejectors in a substantially annular stream surrounding the jet stream flowing therethrough;

means for moving said ejectors between said first and second positions thereof, said means being adapted to permit independent translation of the largest ejector from said first position to a position downstream from said housing;

blocker doors mounted on the largest ejector for movement between a first position wherein they are removed from the channel of said ejector and a second position wherein they are disposed across said channel and deflect said jet stream forwardly to thereby reverse the thrust thereof;

and means for moving said blocker doors between said first and second positions thereof.

2. Apparatus as defined in claim 1 wherein:

said thrust nozzle projects rearwardly from the aft end of said housing; and said ejectors are disposed around said thrust nozzle when in said first position thereof.

3. Apparatus as defined in claim 2 wherein:

said thrust nozzle is formed with a plurality of lobes which extend longitudinally thereof and are spaced apart circumferentially thereon; and when said ejectors are in said first position thereof there is a gap between said nozzle and the ejector nearest thereto, slipstream air flowing through said gap to thereby reduce aerodynamic drag upon said nozzle.

4. Apparatus as defined in claim 3 wherein said ejectors are shaped so that they conformably fit around the lobes of said nozzle when in said first position thereof.

5. In a jet propulsion assembly wherein an exhaust-conducting nozzle projects from the aft end of an engine nacelle, sound-suppressing and thrust-reversing apparatus comprising a pylon mounted on said nacelle and projecting from the aft end thereof, a first tubular ejector mounted on said pylon for movement longitudinally thereof while being maintained in substantially coaxial relation with said nozzle, said first ejector being disposable in spaced relation around said nozzle and having a pair of oppositely disposed apertures in the wall thereof, a pair of blocker doors mounted on said first ejector for movement between a first position wherein they respectively close said apertures and a second position wherein they are disposed transverse to said apertures and project into the interior of said first ejector, means operatively associated with said assembly for driving said first ejector toward and away from said nacelle, means operatively associated with said assembly for moving said blocker doors to said second position thereof when said first ejector is moved to a predetermined position thereof when said first ejector is moved to a said predetermined position aft of said nacelle and for returning said blocker doors to said first position thereof when said first ejector is moved away from said predetermined position, a second tubular ejector operatively associated with said assembly and movable longitudinally of said nozzle while being maintained in substantially coaxial relation therewith, said second ejector being disposable in spaced relation between said nozzle and said first ejector when the latter is disposed around said nozzle, a third tubular ejector operatively associated with said assembly and movable longitudinally of said nozzle while being maintained in substantially coaxial relation therewith, said third ejector being disposable in spaced relation between said first and second ejectors when the latter are disposed around said nozzle, and means operatively associated with said assembly for driving said second and third ejectors toward and away from said nacelle, whereby said ejectors can be selectively moved between a forward position wherein the aft ends thereof are adjacent the aft end of said nozzle and an aft position wherein the forward end of said second ejector encircles the aft end of said nozzle and is spaced therefrom, the forward end of said third ejector encircles the aft end of said second ejector and is spaced therefrom, and the forward end of said first ejector encircles the aft end of said third ejector and is spaced therefrom.

6. Apparatus as defined in claim 5 including two sets of rails respectively attached to the outer surfaces of said nozzle and said second ejector and extending lengthwise thereof in circumferentially spaced relation, and a plurality of bearings respectively mounted on the inner surfaces of said second and third ejectors with their longitudinal axes extending laterally thereof, said bearings being arranged in rows extending lengthwise of a respective one of said surfaces and spaced apart circumferentially thereof, said rows being grouped in closely spaced pairs and respective ones of said rails on said nozzle being abuttingly disposed between bearings of said pairs of rows on said second ejector and respective ones of said rails on said second ejector being abuttingly disposed between bearings of said pairs of rows on said third ejector, whereby said second and third ejectors are movable longitudinally of said nozzle while being maintained substantially coaxial therewith as aforesaid.

7. Apparatus as defined in claim 5 wherein the wall of said nozzle is formed with a plurality of longitudinally extending lobes and the walls of said ejectors conform with the contours of said lobes.

8. Apparatus as defined in claim 5 wherein said means for moving said blocker doors comprises a pair of arms respectively connected to the latter, spring means carried by said first ejector for biasing said blocker doors toward said first position thereof, and a pair of bars mounted on said pylon adjacent the aft end thereof and engageable by respective ones of said arms.

9. A method of operating an aircraft having a jet engine enclosed in a tubular housing, which comprises:

during takeoff and climb of said aircraft, positioning a plurality of tubular ejectors in end-to-end relation downstream from said housing so that the jet stream of said engine flows through said ejectors and so that slipstream air flows into each of said ejectors in an annular stream surrounding said jet stream;

during cruise flight of said aircraft, positioning said ejectors in concentric, nested relation adjacent the aft end of said housing; and during landing of said aircraft, moving one of said ejectors downstream from said housing so that said jet stream flows thereinto, and moving blocker doors carried by the same ejector to a position wherein they deflect said jet stream forwardly and thereby reverse the thrust thereof.

10. The method defined in claim 9 wherein said ejectors are positioned around the thrust nozzle of said engine when said aircraft is in cruise flight.